United States Patent
Perry, III et al.

(10) Patent No.: US 8,521,619 B2
(45) Date of Patent: Aug. 27, 2013

(54) COMPUTER-BASED SYSTEM AND METHOD FOR DETERMINING A QUANTITATIVE SCARCITY INDEX VALUE BASED ON ONLINE COMPUTER SEARCH ACTIVITIES

(75) Inventors: Victor A. Perry, III, Atlanta, GA (US); Lars E. Olufsen, IV, Atlanta, GA (US); Jerry Johannesen, Marietta, GA (US)

(73) Assignee: Autotrader.com, Inc., Atlanta, GA (US)

( * ) Notice: Subject to any disclaimer, the term of this patent is extended or adjusted under 35 U.S.C. 154(b) by 2568 days.

(21) Appl. No.: 10/106,850

(22) Filed: Mar. 27, 2002

(65) Prior Publication Data
US 2003/0187714 A1    Oct. 2, 2003

(51) Int. Cl.
*G06Q 10/00*    (2012.01)

(52) U.S. Cl.
USPC .............................. 705/28; 705/1.1; 705/7.25

(58) Field of Classification Search
None
See application file for complete search history.

(56) References Cited

U.S. PATENT DOCUMENTS

| | | | |
|---|---|---|---|
| 5,299,115 A | 3/1994 | Fields et al. | |
| 5,583,763 A | 12/1996 | Atcheson et al. | |
| 5,774,873 A | 6/1998 | Berent et al. | |
| 5,781,893 A | 7/1998 | Felthauser et al. | |
| 6,006,201 A | 12/1999 | Berent et al. | |
| 6,041,310 A | 3/2000 | Green et al. | |
| 6,078,891 A | 6/2000 | Riordan et al. | |
| 6,185,558 B1 | 2/2001 | Bowman et al. | |
| 6,236,991 B1 | 5/2001 | Frauenhofer et al. | |
| 6,298,328 B1 | 10/2001 | Healy et al. | |
| 6,430,539 B1 | 8/2002 | Lazarus et al. | |
| 6,785,671 B1* | 8/2004 | Bailey et al. | 707/3 |
| 6,868,396 B2* | 3/2005 | Smith et al. | 705/27 |
| 2002/0013781 A1* | 1/2002 | Petersen | 707/10 |
| 2002/0082901 A1 | 6/2002 | Dunning et al. | |
| 2003/0050924 A1* | 3/2003 | Faybishenko et al. | 707/3 |
| 2003/0074391 A1* | 4/2003 | Carter et al. | 709/200 |

OTHER PUBLICATIONS

Cars.com, "About cars.com," http://www.cars.com (8 pages) (2002).
MNS Carpoint: Carpoint Press Room, "Carpoint Background," 9 pages (2000).
Press Release, MNS Carpoint: Carpoint Press Room, "MSN Carpoint Launches Consumer Market Intelligence Service to Help Auto Dealers and Manufacturers Build the Cars Consumers Want," Redmond, WA, Jul. 24, 2000 (2 pages).
Autobytel Inc. Backgrounder, http://www.autobytel.com (3 pages).
Press Release, "Autobytel Inc Launches AIC's AutoSuite 2002, Next-Generation Research Tools for Manufacturer, Dealer Web Sites," New Orleans, LA, Jan. 28, 2002, http://www.autobytel.com (4 pages).
Press Release, "Autobytel Inc. Granted U.S. Patent for Purchase Request System," Irvine California, Dec. 18, 2001, http://www.autobytel.com (3 pages).

(Continued)

*Primary Examiner* — Asfand Sheikh
(74) *Attorney, Agent, or Firm* — Nixon & Vanderhye P.C.

(57) ABSTRACT

An online product or service listing arrangement logs searches performed and uses the logged information to calculate a scarcity index that measures the scarcity of products and services. Scarcity may indicate the number of searches that consumers have conducted compared to available listings. Empirical techniques are used to take into account certain types of searches that may not accurately reflect actual consumer demand. Reports may compare item scarcity within different geographical or other markets to determine relative scarcity. Particularly advantageous but non-limiting applications include new and used motor vehicles, employment opportunities, and real estate.

28 Claims, 10 Drawing Sheets

(56) References Cited

OTHER PUBLICATIONS

Press Release, "Autobytel Inc. Offers Dealerships Same Consumer Research Tools and Data that Power the Majority of Manufacturer Sites," Irvine California, Oct. 10, 2001, http://www.autobytel.com (7 pages).
McFadden, "Posting your prices online, The positives and negatives," eDealer online newsletter, http://www.cobaltgroup.com/enews (Sep. 2000).
What can Cobalt do for You?, http://www.cobaltgroup.com (6 pages).
DealerNet.com—The Key to Your Car, http://dealernet.com (2 pages).
Information retrieved from the http://www.powerinfonet.com web site: "Welcome to the Power Information Network" (30 pages).
"Grading Overview," *Crown comics Grading Guidelines and Scarcity Index* from http://www.crowncomics.com/grading/index.htm (5 pages).
"Toward an Index of Water Scarcity" excerpted from "Sustaining Water", http://www.cnie.org/opo/pai/water-13.html (2 pages).
Auto Remarketing News, "Dealers Assess Local Used-Car Demand with New Tool," Irvine, California, 2 pages (Jan. 29, 2002).
www.theautochannel.com, N.A.D.A. Official Used Car Guide Company and The Reynolds and Reynolds Company Develop On-Line Tool, Dayton, Ohio, 3 pages (Jan. 26, 2002).

\* cited by examiner

Fig. 3A

| Research & Compare | Find Your Car | Sell Your Car | New Cars | Finance & Insurance | Car Care | Collector Cars |

Research & Compare
Get the latest pricing, reviews and specifications on new and used cars.
Used Car Research
New Car Research

Find Your Car
Search the largest inventory of cars and trucks on the Internet. More than 1.5 million listings, updated daily. 230
Select Make  234  236
[Alfa Romeo ▼] (Find Used Cars)
Enter ZIP Code
[22205] 232 (Find New Cars)

*eb* & *AutoTrader*  *MARKETPLACE*
Going once... going twice... buy or sell at the eBay & AutoTrader.com Marketplace.

Sell Your Car
Reach millions of buyers nationwide! List Your Car Today on AutoTrader.com's online classifieds or through the eBay Marketplace.

Edit an Existing Listing

New Cars
Get the information you need to select the right new car:
Price a New Car
Find New Cars
Buy Online
New Car Research

Finance & Insurance
Save time and money with online quotes.
Calculators: Find out how much you can borrow.
Insurance: Get free insurance quotes.
Finance: Compare loan rates.
Warranty: Get free warranty quotes.

Car Care
Find Auto parts, accessories, services, or collectibles, all in place!

*How do you know which tires are right for you?*

*insWEB*
*insWEB*

TraderOnline.com
Boats, RVs, Collector Cars, Motorcycles and More
CareerWeb.com
Jobs, Resumes and Career Advice
HarmonHomes.com
85,000+ Homes
ForRent.com
Over 12 Million Apartments
Roomsaver.com
5,000+ Motel Discount Coupons
Parenthood.com
Helping Families Grow Find A Dealer | Collector Cars | About | Help | Employment Opportunities | Email Us
By using this service, you accept the terms of our Visitor Agreement.
Privacy Statement
©2002 AutoTrader.com L.L.C.

| Research & Compare | Find Your Car | Sell Your Car | New Cars | Finance & Insurance | Car Care | Collector Cars |

Home > Car Search > Used Car Search

| Basic Search | Advanced Search |

Make Jeep  Change make  ⟋238

Model [Wrangler ▼]

Body Style All Styles   (i.e. Convertible, Coupe)

Color [All Colors ▲] To select Colors, hold down the
             [Beige   ]  "Control" key on your keyboard
             [Black  ▼]  ("Command" for Mac users), and
                         click up to three selections.

Mileage [Any Mileage ▼] (i.e. Under 15,000, Under 30,000)

Doors [Any Number ▼] (i.e. Two Door, Four Door)

Engine [All Engines ▼] (i.e. 4 Cylinder, 6 Cylinder)

Fuel Type [All Types ▼] (i.e. Diesel, Gasoline)

Drive Type [All Types ▼] (i.e. 2 wheel drive, 4 wheel drive)

240 — Transmission [All Types ▼] (i.e. Automatic, Manual)

From year [2000 ▼] to year [2000 ▼] — 242

246

From price [   ] to price [   ] (i.e. 10500 not $10,500)

244 — If you do not enter a price, your Search
           Results will include vehicles with no
           price listed.

248
       Cars with prices only

Distance [25 miles ▼]  from 22205

Only vehicles matching your selections will be shown.

250
           ( Search )

Go to Basic Search

| | Overall Vehicle Scarcity for All Vehicles by DMA or Nationally | | | | | | | |
|---|---|---|---|---|---|---|---|---|
| DMA | Make | Model | Searches | Vehicles | Srch/Veh | Scarcity | NatScar | Difference |
| Billings | Jeep | Cherokee | 13002 | 28 | 464 | 3555 | 5410 | -1856 |
| Billings | Ford | Explorer | 1098 | 3 | 366 | 2802 | 2951 | -149 |
| Billings | Acura | RL | 319 | 1 | 319 | 2442 | 1436 | 1006 |
| Billings | Porche | 968 | 557 | 2 | 279 | 2132 | 1408 | 724 |
| . | . | . | . | . | . | . | . | . |
| . | . | . | . | . | . | . | . | . |
| National | Jeep | Cherokee | 5785842 | 57858 | 100 | | | 0 |

| | Vehicle Scarcity of Specific Make of Vehicle, either by DMA or Nationally | | | | | | |
|---|---|---|---|---|---|---|---|
| DMA | Make/Model | Searches | Vehicles | Srch/Veh | Scarcity | NatScar | Difference |
| Billings | Acura RL | 319 | 1 | 319 | 2442 | 1436 | 1006 |
| Billings | Acura NSX | 2415 | 14 | 173 | 1321 | 2199 | -879 |
| Billings | Acura MDX | 1909 | 14 | 136 | 1044 | 1336 | -293 |
| Billings | Acura RSX | 1625 | 23 | 71 | 541 | 1089 | -548 |
| Billings | Acura SLX | 408 | 7 | 58 | 446 | 447 | -1 |
| Billings | Acura Vigor | 984 | 17 | 58 | 443 | 524 | -81 |
| Billings | Acura Integra | 13732 | 348 | 39 | 302 | 491 | -188 |

Fig. 5B

Vehicle Scarcity of Specific Make of Vehicle, by year, either by DMA or Nationally ~108C

| DMA | Make/Model | Year | Searches | Vehicles | Srch/Veh | Scarcity | NatScar | Diff |
|---|---|---|---|---|---|---|---|---|
| Billings | Acura Integra | 2001 | 1452 | 105 | 13.8 | 17 | 17 | 1 |
| Billings | Acura Integra | 2000 | 1392 | 19 | 73.3 | 92 | 53 | 39 |
| Billings | Acura Integra | 1999 | 1396 | 75 | 18.6 | 23 | 29 | -6 |
| Billings | Acura Integra | 1998 | 1380 | 50 | 27.6 | 34 | 31 | 4 |
| Billings | Acura Integra | 1997 | 1288 | 52 | 24.8 | 31 | 35 | -4 |
| Billings | Acura Integra | 1996 | 836 | 44 | 19.0 | 24 | 30 | -6 |
| Billings | Acura Integra | 1995 | 604 | 5 | 120.8 | 151 | 102 | 49 |
| Billings | Acura Integra | 1994 | 433 | 0 | . | . | . | . |
| Billings | Acura Integra | 1993 | 334 | 0 | . | . | . | . |
| Billings | Acura Integra | 1992 | 292 | 0 | . | . | . | . |
| Billings | Acura Integra | 1991 | 248 | 0 | . | . | . | . |
| Billings | Acura Integra | 86-90 | 243 | 0 | . | . | 6336 | . |
| Billings | Acura Integra | 81-85 | 174 | 0 | . | . | . | . |

Fig. 5C

COMPUTER-BASED SYSTEM AND METHOD FOR DETERMINING A QUANTITATIVE SCARCITY INDEX VALUE BASED ON ONLINE COMPUTER SEARCH ACTIVITIES

CROSS-REFERENCES TO RELATED APPLICATIONS

Statement Regarding Federally Sponsored Research or Development

Not applicable.

BACKGROUND AND SUMMARY OF THE INVENTION

The advent of widespread computer networks such as the Internet and the connectivity they provide has facilitated and enhanced the marketing of many types of products and services. For example, online Internet auction services now give buyers from all over the country and the world the opportunity to bid on a wide variety of goods and services. Products and services that consumers could previously find only by scanning newspaper classified ads or going to auctions or yard sales can now be located almost instantly by logging into an online auction or listing system via the Internet and conducting electronic searches. Many newspapers and other services post classified ads online so they can be efficiently searched and responded to by any Internet computer user anywhere. Business-to-business transactions have similarly been significantly enhanced by the use of the Internet and other computer networks.

Even though computer networks have fundamentally changed certain attributes of many commerce transactions, basic principles of economics still apply. For example, to keep customers happy, sellers of products and services generally need to ensure an adequate supply. Customers will be disappointed and go elsewhere if the seller cannot readily supply the particular product or service the buyer wishes to buy. Similarly, to minimize inventory expense, spoilage and devaluation, the seller generally wants to avoid keeping a large volume of unsold products or services in inventory. Also, a seller can generally charge more for products and services that are in high demand relative to their supply, and typically must charge less for products and services the supply for which greatly exceeds demand. It is therefore important for sellers and buyers on and off the Internet to get an idea of the supply of products or services relative to demand.

"Scarcity" captures the concept of insufficient supply of a product or service to meet demand. If a product or service is scarce, the demand exceeds supply and a seller may be able to command a higher price or receive other benefits. A product or service that is not scarce has sufficient supply relative to demand—sometimes requiring the seller to lower the price or make other adjustments. A seller may be willing to pay more to obtain a scarce product or service, and may be willing to hold more scarce products and services in inventory for longer periods of time—waiting for customers who will offer the right price.

Even though scarcity is generally an important factor in determining basic issues concerning sale and procurement, it is generally difficult to accurately and efficiently measure scarcity of particular products or services. Sometimes, a seller or buyer can anticipate and capitalize on product scarcity. On the other hand, some times the first indication that a particular product is scarce is when the seller is sold out and cannot readily obtain any more and the buyer is disappointed.

For example, supply and demand is not always defined by periodic sales volume. Sometimes, sales are as a result of available supply, while demand can be reflected in increased gross profit or even unfulfilled consumer purchase desire. Gross profit is typically not available on a mass basis. Despite these issues, it would be highly desirable to find an efficient and cost-effective way to automatically measure relative scarcity and thereby predict product scarcity through use of computers and computer networks.

The present invention solves this problem by leveraging the new electronic commerce infrastructures of computer networks such as the Internet and the wealth of transaction information that online Internet and other auction and listing services can provide, to efficiently assess and report on the scarcity of products and services.

In accordance with one aspect of a preferred illustrative exemplary embodiment of the invention, an online product or service listing facility provides an online searchable listing of products or services being offered. For example, in accordance with one exemplary illustrative embodiment, a web site lists classified ads for products and services and enables consumers to search the listings for products and/or services they are interested in. In the exemplary illustrative embodiment, the online listing service records information about searches that consumers have conducted, and compares the recorded information to available listings. The comparison may be geographical and/or market based. The result of the comparison is used to calculate a scarcity index for particular products or services—market-wise and/or in a particular geographical or other market area.

In accordance with another aspect of an exemplary illustrative embodiment, the scarcity index may be calculated using variables that represent the relationship between the products and/or services searched and the products and/or services listed online. For example, the scarcity index may be calculated as:

$$\text{Scarcity Index} = (\text{searches per listing}/\text{mean searches per listing}) * 100.$$

In this illustrative non-limiting embodiment, calculating the mean searches per listing by market provides a "normalized" meaning to the scarcity index. This allows the resulting values to have the same meaning for different markets. Moreover, the preferred exemplary arrangement may calculate different scarcity indices for different geographical markets (e.g., particular countries, particular cities, etc.)—allowing for comparison of scarcity of a product and/or service between different geographical or other markets.

In accordance with yet another aspect of a preferred exemplary embodiment, the following information is used to generate scarcity information:
- periodic (e.g., monthly) searches for each product and/or service (by market);
- periodic (e.g., monthly) inventory for each product and/or service (by market);
- the ratio of searches to inventory (by market);
- average searches (by market);
- average inventory (by market); and
- the ratio of average searches to average inventory (by market).

In accordance with yet another non-limiting aspect of a preferred illustrative exemplary embodiment, the monthly inventory calculation may be derived from a short (e.g., one-day) snapshot of the inventory database (i.e., a relatively static representation of product and/or service inventory).

In one illustrative exemplary embodiment, scarcity reports may be delivered as paper printouts, via data display on an online real time basis, via email, or by other means.

In accordance with a further aspect, these scarcity reports may be provided to market participants who are not necessarily within the same precise channel of commerce that the online listing service serves. For example, an online listing service that primarily serves private buyers and sellers may provide scarcity information to professional dealers, or vice versa.

In accordance with yet another exemplary aspect, scarcity may be reported in a variety of different formats such as for example:
  information sorted by scarcity index;
  information sorted by particular products and/or services with any desired amount of detail;
  other.

In accordance with yet another aspect, a scarcity report may include the following data for each product and/or service:
  detailed product identification,
  total searches (in the selected market),
  total listings (in the selected market);
  searches per listing (in the selected market),
  scarcity (in the selected market),
  national scarcity index,
  comparison with the scarcity in the selected market to the national scarcity,
  other information.

In accordance with yet another aspect, the preferred illustrative exemplary embodiment improves accuracy by using empirical analysis to further process (e.g., weight) raw scarcity index values for selected items or categories to take certain human psychology factors into account. For example, many of us will occasionally spend time searching for products and services we do not actually intend to purchase. As one example, people will sometimes search for "high ticket" items (e.g., a 1965 Mustang Convertible automobile, an expensive camera, a private jet, a high-priced designer dress, a beach house in the Bahamas, etc.) simply out of curiosity. If there are a significant number of such searches, raw scarcity indices can become skewed because such searches provide a false indication of consumer demand. The application of an additional, empirical weighting process to adjust the raw scarcity index improves accuracy by taking such psychological factors into account.

The techniques, systems and methods provided in accordance with the present invention are useful in a variety of different contexts for a variety of different products or services. One particularly advantageous but non-limiting use is in connection with the sale of new and used automobiles involving a web-based online regional or nationwide automobile listing service that lists used and/or new automobiles for sale to consumers. In this non-limiting arrangement, the automobile listing service collects vehicle supply information for particular vehicles by make/model/year, based on the number of ads that are listed with the listing service, and collects consumer interest information based on the online searches conducted by consumers who make use of the vehicle listing service to locate vehicles. In this non-limiting illustrative arrangement, the scarcity reporting may be delivered to a different marketing channel than the one that searches the listings. For example, the listing may typically be searched by consumers looking to purchase a new or used vehicle, and the scarcity index report may be delivered to dealers of new and used automobiles who would like to know the scarcity of used and/or new vehicles to assist them in making pricing, inventory and other decisions.

While one illustrative application of the present invention provides particular advantages and benefits in the new and/or used vehicle marketing area, the present invention is not limited to those particular products but may be useful, advantageous and applicable in a variety of other product and/or service areas including, for example:
  new and/or used home sales,
  apartments, houses and condominiums for rent,
  new and/or used boats, airplanes, motorcycles, and other types of vehicles for sale or lease,
  employment opportunities,
  travel accommodations,
  rare and/or comic books,
  stamps and coins,
  collectibles of any sort,
  home entertainment equipment,
  exercise equipment,
  construction equipment,
  business fixtures,
  leases (residential and/or business),
  consulting services,
  any product or service that can be bought, sold or leased.

BRIEF DESCRIPTION OF THE DRAWINGS

These and other features and advantages provided in accordance with exemplary and illustrative embodiments of the present invention may be better and more completely understood by referring to the following detailed description in conjunction with drawings, of which:

FIGS. 3A-3C show example illustrative search screens;

FIGS. 5A-5C show illustrative scarcity reports.

DETAILED DESCRIPTION OF PRESENTLY PREFERRED EXEMPLARY EMBODIMENTS

Figure 1:
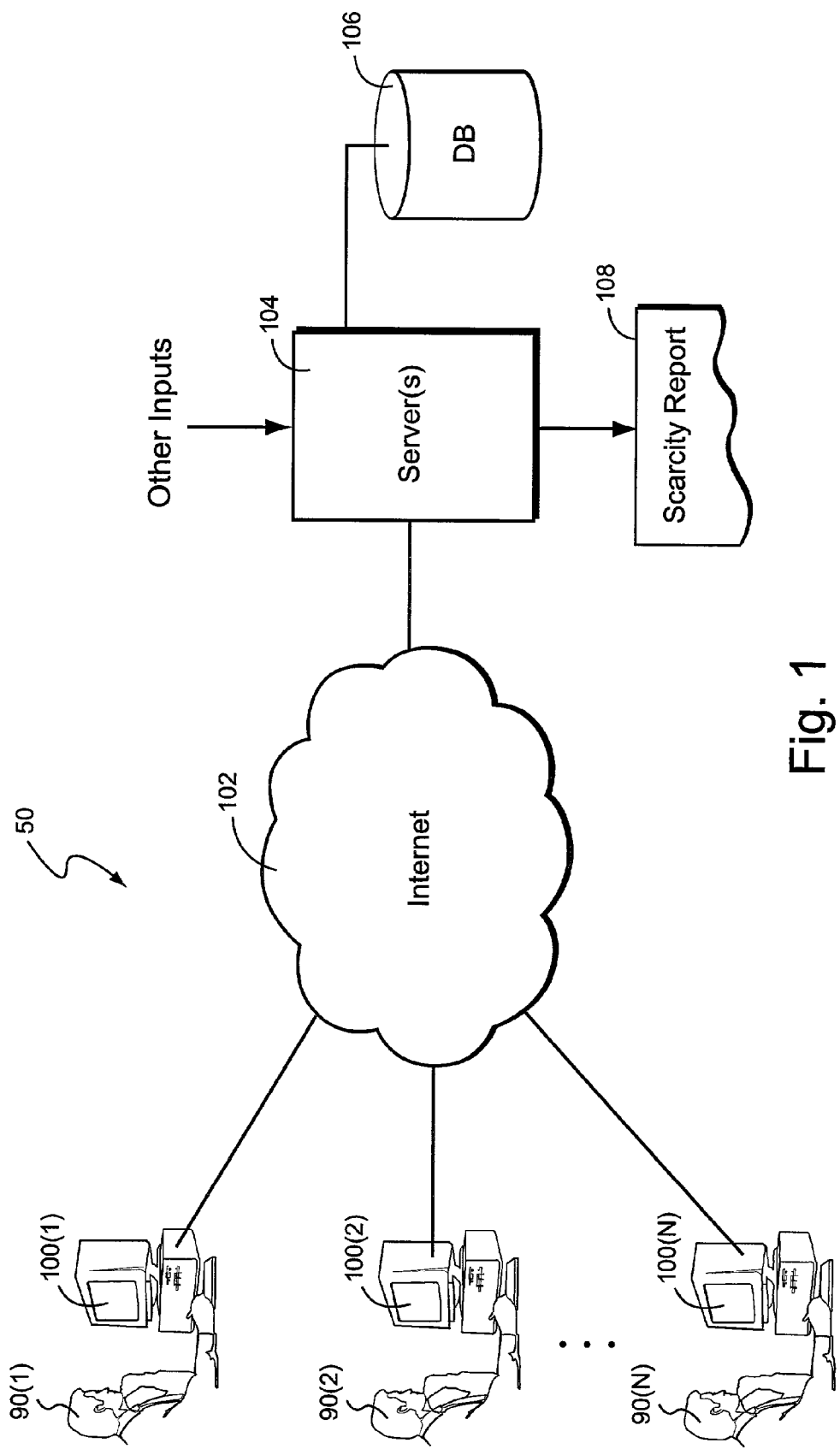
FIG. 1 is a block diagram of an overall exemplary illustrative embodiment providing product or service online listings and scarcity reporting.

FIG. 1 is a block diagram of an overall exemplary illustrative non-limiting preferred embodiment of an online product and/or service listing and scarcity reporting system 50. In the exemplary illustrative embodiment, system 50 provides simultaneous access to any number of online consumers 90(1), 90(2), . . . , 90(N) via the Internet 102 or other telecommunications network. In the exemplary embodiment, each online consumer 90 uses an access appliance 100 to access system 50. Appliances 100 can take a variety of different forms including for example a personal or pocket computer equipped with a web browser or other information accessing capability; a cellular telephone; a personal digital assistant; a conventional voice telephone; a web television; or any other appliance capable of receiving and sending information. In the exemplary embodiment shown in FIG. 1, each of consumers 90 is an Internet user who uses a web browsing appliance 100 including a display device and a user-manipulable input device, but the invention is not restricted to an Internet-based system.

In the illustrative embodiment, appliances 100 communicate with web-based server(s) 104 over the Internet 102 or other network. Web-based server(s) 104 communicates with appliances using http or other standard protocols. Server(s) 104 has access to a database 106 listing products and/or services being offered. Consumers 90 can use appliances 100 to input and send search criteria to search the offering database 106. In the exemplary embodiment, appliances 100 send these search criteria to server(s) 104 via the Internet or other network 102.

The server(s) 104 use the search criteria to search listings in database 106. Server(s) 104 transmit search results back to appliances 100 (e.g., in the form of one or more web pages) for viewing by consumers 90. In some cases, the search results that service(s) 104 send back to the consumers 90 may include additional information that allows the consumers to purchase or attempt to purchase the items. For example, in a sales environment, the search results may include hypertext links or other information that allows the consumer to purchase the item or facilitates such a purchase (e.g., via conventional electronic commerce engines). In an online auction environment, the search results may include information that allows a consumer to enter a bid in an online auction that may also be administered by server(s) 104. In a listing environment, server(s) 104 may provide seller contact information such as telephone number, email address or the like that allows the consumer to contact the purchaser. Other arrangements are possible.

In the preferred illustrative embodiment, server(s) 104 log certain information about each search performed. The preferred exemplary illustrative server(s) 104 logs a variety of information based on search requests received, including for example:

time/date of each search;
product or service the search was directed to;
originating zip code or other geographical location information for each search; and
other information.

Server(s) 104 (or other computer(s) coupled thereto) use this logged information in conjunction with the information within database 106 to determine or assess scarcity indexes.

The logged information is further processed and used to generate a scarcity report 108 that indicates the scarcity of one or more selected products or services. The scarcity indicates demand of product versus its supply. The scarcity can be determined for particular geographical markets in the preferred exemplary embodiments. Geographical markets are the combination of Zip codes into City, State, or Demographic Metro Areas (DMAs). Scarcity report 108 may be delivered as paper printouts, via data display on an online real time basis, via email, or in any convenient fashion.

In the exemplary embodiment, the scarcity report 108 server(s) 104 (or other computer(s) not shown connected thereto) calculates a "scarcity index" with respect to particular products or services. In the preferred exemplary embodiment, the scarcity index ("SI") is a variable calculated by server(s) 104 (or other computer(s) coupled to the server(s) and the database 106) that represents the relationship between products and/or services searched by consumers 90 and products and/or services listed in database 106. As one example, the scarcity index may be calculated as:

$$\text{Scarcity Index} = (\text{searches per listing}/\text{mean searches per listing}) * 100$$

where:

"searches" is the number of searches consumers 90 present over a given time period (e.g., monthly) for each product or service, "listing" is the inventory for each product or service over that same time period (i.e., as listed in database 106), "searches per listing" is the ratio of the average searches to average inventory, and "mean searches per listing" is the average (mean) number of searches across listings in database 106 (i.e., an indication of overall consumer interest in all of the relevant listings collectively).

In the preferred embodiment, each of the above items is selectively further qualified by a specific geographical (or other desired sub-market) area if desired to provide a Scarcity Index based on specific markets such as geographical areas. For example, each search may be logged based on the metropolitan area or other region from which it originated, and each inventory item may be listed based on the metropolitan area or other region where the product or service is located. In this way, Scarcity Index may be calculated for specific geographical markets (e.g., greater Dallas area, New York City area, all across the United States, all of North America, by country in Europe, etc.). Geographical markets are the combination of Zip codes into City, State, or Demographic Metro Areas (DMAs). Other submarket criteria include, for example: date/time qualification (e.g., seasonality, recentness, etc.); user response based criteria (e.g., whether the consumer requested additional information, made a purchase, etc.); or other criteria.

Such geographical-based Scarcity Index calculations can be very useful. For example, dealers of certain types of products and services may want to know the scarcity within their own geographical region. This is especially useful with respect to products and services that are not easily transportable or for which prevailing local markets tend to control pricing and other transaction characteristics (e.g., home sales and leases, employment opportunities, automobiles, heavy equipment, etc.).

Different scarcity indices may be calculated for different geographical markets (e.g., nationwide, particular cities, etc.)—allowing for comparison of scarcity of a product and/or service between different geographical or other markets (for example, scarcity of a product or service in a particular geographic area as compared with scarcity across the nation or other, different geographical area). In an illustrative non-limiting embodiment, calculating the mean searches per listing by market (see equation above) provides a "normalized" meaning to the scarcity index. This allows the resulting values to have the same meaning for different markets.

In the preferred illustrative exemplary embodiment, the "listing" value mentioned above may be derived from a snapshot (e.g., one-day) of the database 106 to provide a more static representation of product and/or service inventory. While more complicated estimations or determinations of inventory (e.g., an average or a sum) are possible, it is relatively efficient for server(s) 104 to simply count the number of listings of particular products and/or services within database 106 at a particular time to determine available inventory. Of course, if the inventory listed within database 106 is very rapidly changing, then a rolling average or other technique might be used.

Based on the logged search information and the listing information within database 106, server(s) 104 (and/or other computers communicating therewith) calculate the following in the preferred illustrative embodiment:

periodic (e.g., monthly) searches for each product and/or service (by market);
periodic (e.g., monthly) inventory for each product and/or service (by market);
the ratio of searches to inventory (by market);

average searches (by market);
average inventory (by market);
the ratio of average searches to average inventory (by market).

This information may be used to calculate the scarcity index. Some or all of the information can also be listed on the scarcity report 108.

In one illustrative exemplary embodiment, scarcity report 108 may include some or all of the following data for one (or each) product and/or service:
detailed product identification,
total searches (in a selected market),
total listings (in a selected market);
searches per listing (in a selected market),
scarcity (in a selected market),
overall or national scarcity index,
comparison with the scarcity in a selected market to the overall or national scarcity.

Information on scarcity report 108 may be set forth in a variety of different formats such as for example:
information sorted by scarcity index (ascending or descending);
information sorted by particular products and/or services (with any desired amount of detail);
other.

DETAILED ILLUSTRATIVE EXAMPLE

Figure 2A:
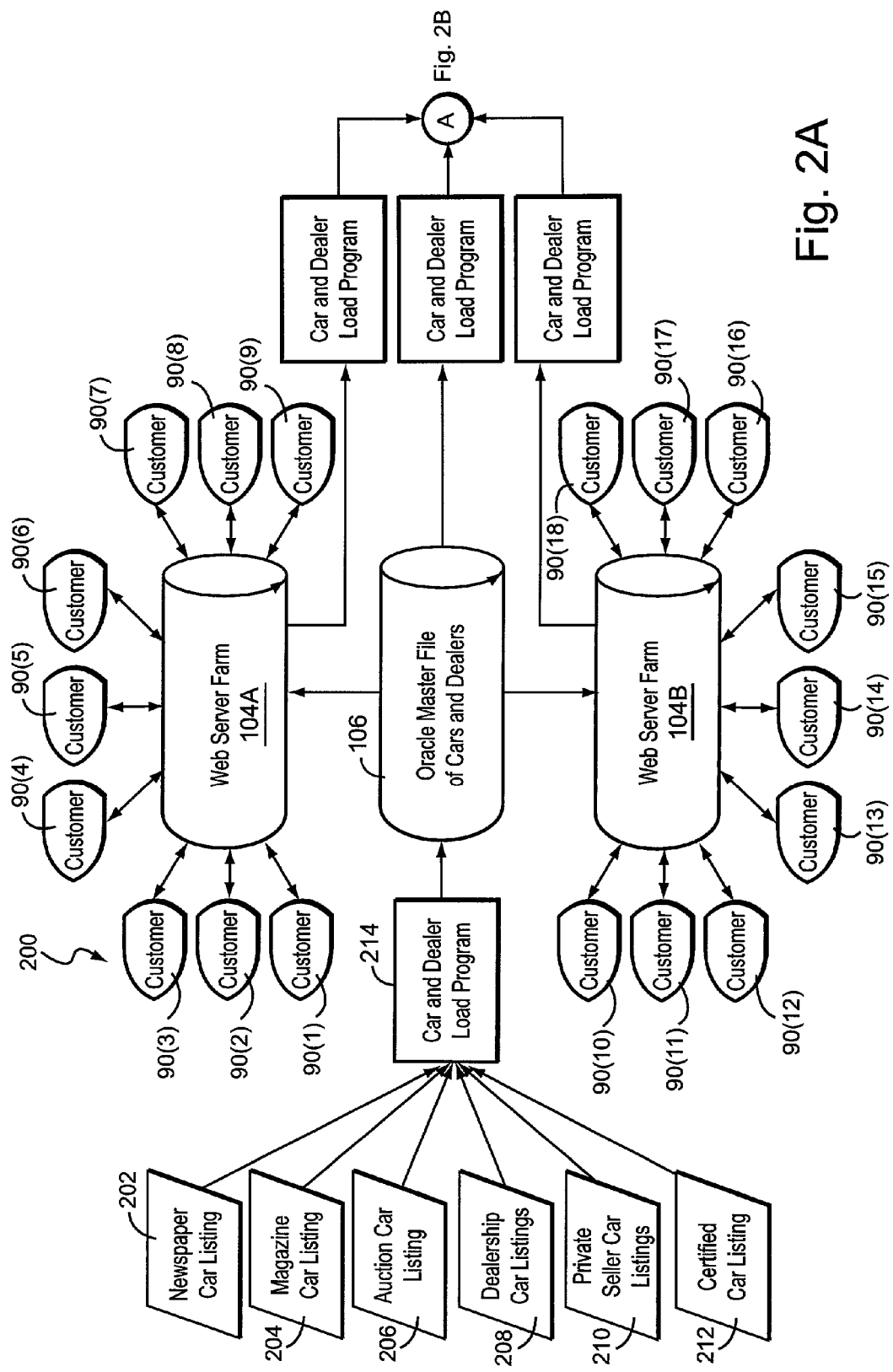
FIGS. 2A and 2B show an exemplary overall illustrative method for generating scarcity reports.
Figure 2B:
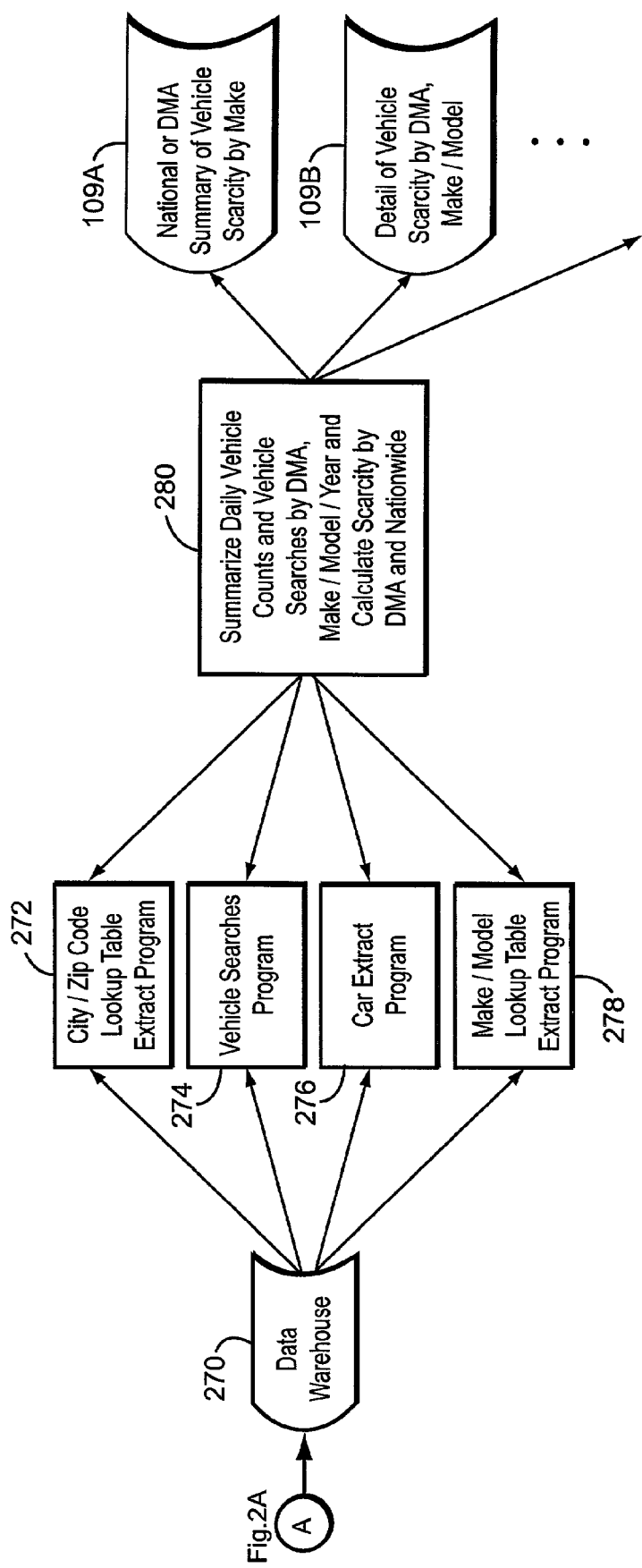

FIGS. 2A and 2B show a more detailed illustrative example in the form of a new and used automobile listing service 200. In this example, servers 104 comprise multiple web server farms 104a, 104b, . . . , 104n serving customers 90 in respective different geographical areas (e.g., west coast of the United States, east coast of the United States). Database 106 comprises an Oracle master file of cars and dealers. This master file 106 may be derived from a number of sources including, for example,
newspaper car listings 202,
magazine car listings 204,
auction car listings 206,
dealership car listings 208,
private seller car listings 210,
certified car listings 212,
other source(s).
These listings from these various sources 202-212 are loaded into database 106 via a load program 214.

Figure 3B:
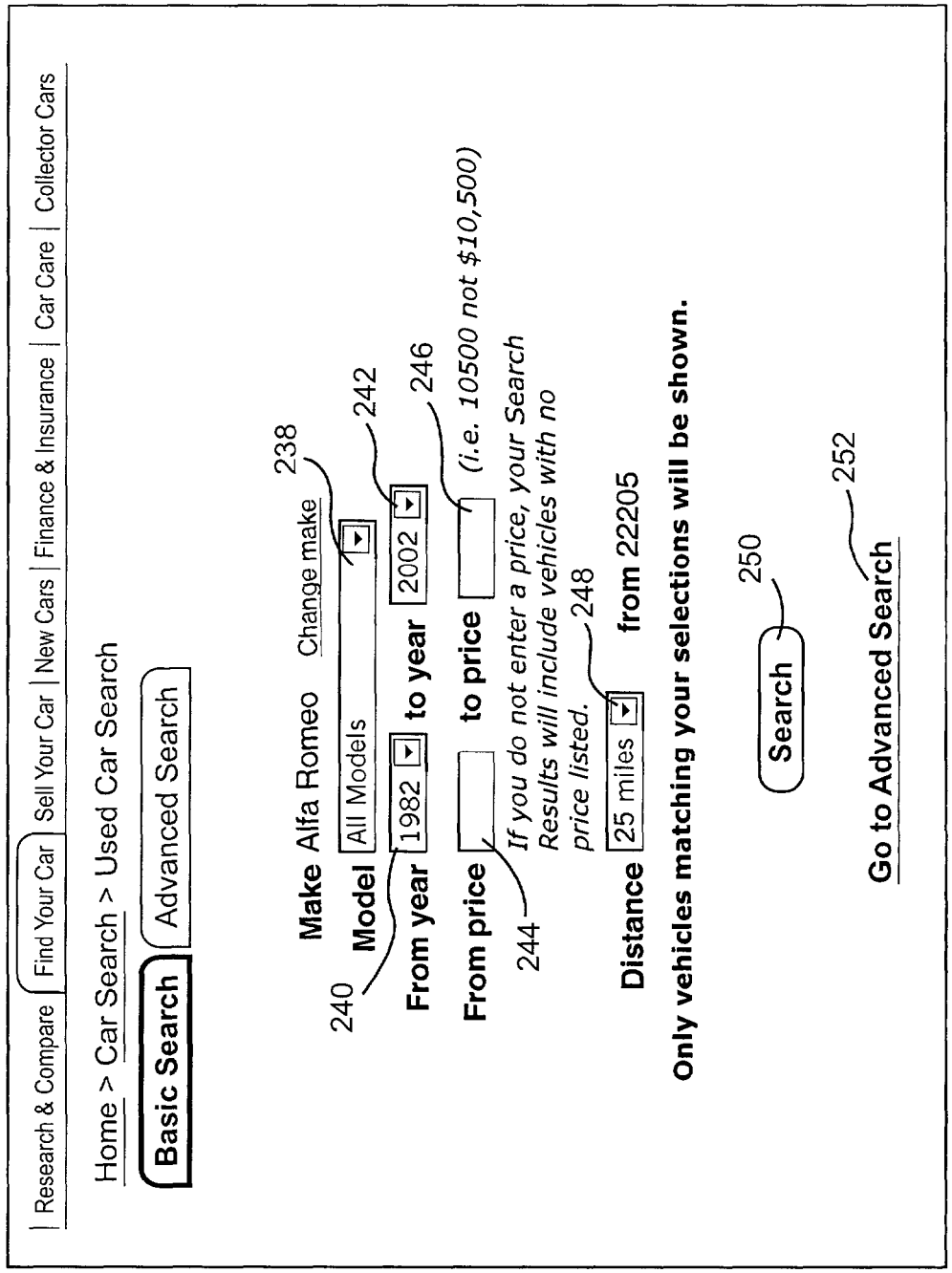

In the example embodiment, the web servers 104 allow customers 90 to conduct various types of searches on the available listings within database 104. FIGS. 3A-3C show some example search screens that a consumer 90 may use to search the listings within database 106. Referring to FIG. 3A, a consumer 90 can select a make of vehicle via a pull-down or other data input field 230. The consumer 90 is also requested, in the preferred exemplary embodiment, to enter his or her zip code or other geographical indicator within a field 232 to indicate where the consumer is located. The user may then select between searching for used cars (button 234) or new cars (button 236). Upon depressing one of buttons 234, 236, an additional screen appears.

When the user selects the "used" car search button 234, the exemplary illustrative web server 104 presents a screen such as that shown in FIG. 3B that asks the user to select a particular vehicle model (field 238) and a particular year of manufacture range (fields 240, 242). Additionally, the consumer may optionally select a price range (fields 244, 246). The consumer may also select a further geographical radius search limitation (field 248) to restrict the search to a particular geographical radius relative to the consumer's own location. The user may then initiate a search by selecting a "search" button 250, or may alternatively select an "advanced search" link 252 which in the exemplary embodiment calls up the more detailed search screen shown in FIG. 3C (this more detailed screen allows the user to further restrict the search to particular body styles, colors, mileage, number of doors, engine type, fuel type, drive train, transmission or other characteristics).

In response to initiation of a search, servers 104 search the database 106 and return to the consumer appliance 100 one or more screens of information describing the characteristics of particular vehicles within database 106. Depending upon the context, this information returned to consumers 90 in the exemplary embodiment might provide contact information or other mechanism to allow an interested consumer to contact the seller, or it might allow a consumer to initiate a purchase transaction, or it might allow the consumer to enter a bid for an auction of the item.

Meanwhile, for each search performed, servers 104 log in a data file, particular information concerning the search including, for example:
time/date of search,
zip code or geographical indicator of consumer who performed the search (this information may be obtained from zip code information the consumer inputted),
some or all of the inputted search criteria,
identification of listing(s) returned by search,
number of listings returned by search,
in an appropriate context, outcome (e.g., whether or not the consumer selected or took other action based on the listing),
other information.

In the exemplary embodiment, the search logs are warehoused within a data warehouse 270 that may be located on the same or different mass storage device used to store database 106. For sake of efficiency, this data warehouse 270 is, in one exemplary embodiment, located on a different mass storage device coupled to a different computer that is used to assess and report on scarcity. A copy of the listing database 106 may also be transferred to the data warehouse 270 to allow for scarcity analysis without disrupting access to the database by online consumers 90.

In the exemplary embodiment, as shown in FIG. 2B, various analysis programs are used to analyze the listing database 106 entries, conduct searches and generate a scarcity index. For example, in the exemplary illustrative embodiment:
a city/zip code lookup table extract program 272 correlates zip codes inputted by the consumer 90 (see FIG. 3A, field 232) with corresponding geographical market (DMA) identification information;
a vehicle searches extract program 274 extracts particular vehicle data (e.g., geographical location, year, make, model) encompassed by a particular search;
a car extract program 276 extracts particular vehicle listings responsive to a particular search—including the geographical location of each particular vehicle;
a make/model lookup table extract program 278 correlates the make and model selections (see FIG. 3A, field 230 and FIG. 3B, field 238) with specific make/model combinations (e.g., when a consumer inputs "HON" as the make and "ACCORD" as the model, the make/model combination is "Honda Accord."

These various programs 272, 274, 276, 278 may be used to provide responsive listing information back to consumers 90 in real time. In addition, they are used to increment counts or other logging in order to provide a summary of daily vehicle counts and vehicle searches by geographical area ("DMA"), make/model/year (see FIG. 2B, block 280). This logged information is used in the preferred exemplary embodiment to calculate scarcity by geographical area (e.g., a particular DMA and nationwide) (FIG. 2B, block 280). The scarcity may be reported in a variety of different formats including, for example, national or DMA summary of vehicle scarcity by make (block 109*a*), detail of vehicle scarcity by DMA make/model (block 109*b*), or other formats.

Figure 4A:
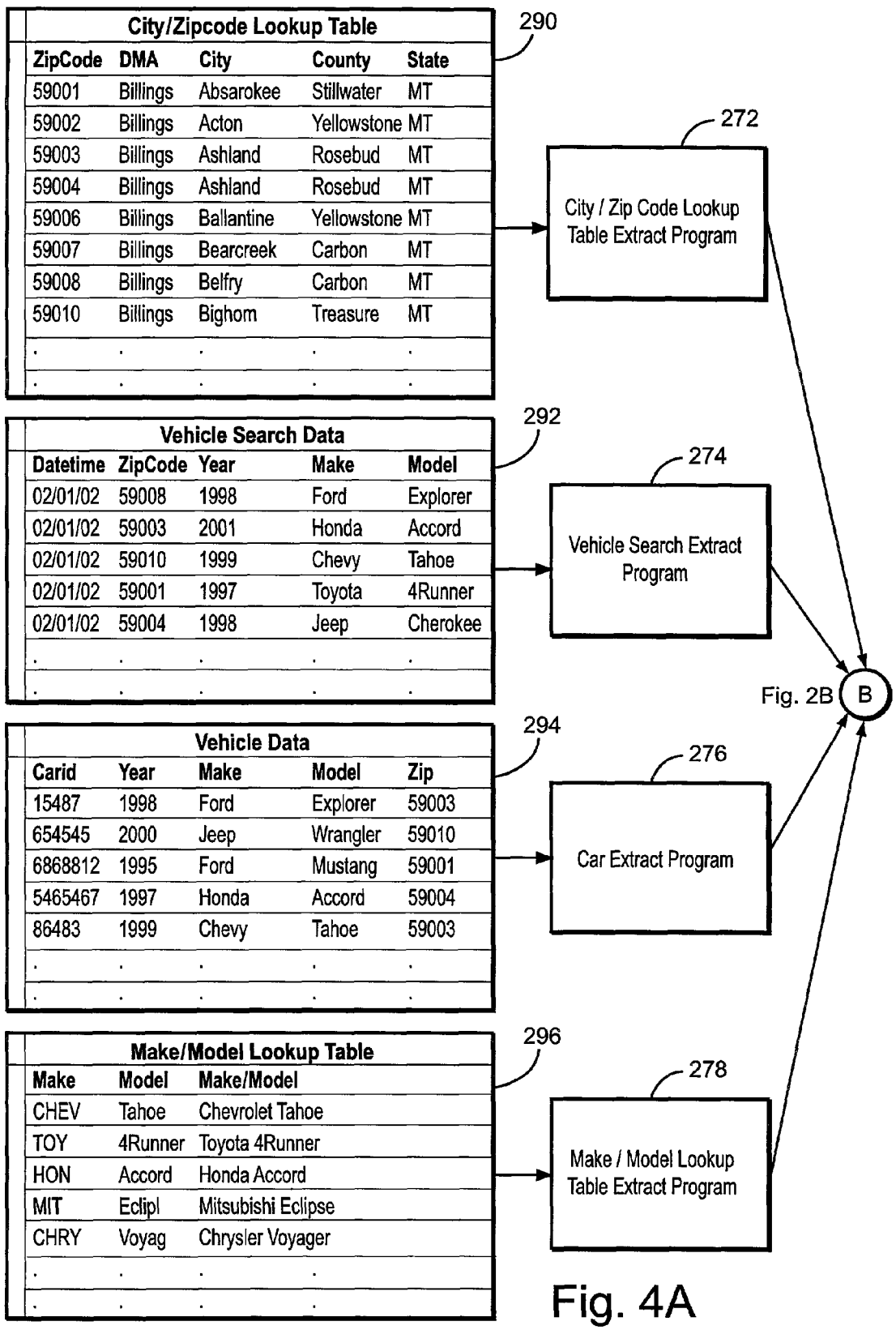
FIGS. 4A and 4B are together a flowchart showing more detailed processing to assess scarcity.

FIG. 4A shows a more detailed break-out of the city/zip code lookup table extract program 272, vehicle search extract program 274, car extract program 276 and make/model lookup table extract program 278. In the example shown, the city/state zip code lookup table extract program 272 makes use of a city/state lookup table 290 that correlates zip code with DMA. In the example shown, the vehicle search extract program 274 makes use of vehicle search data 292 (within database 106) of vehicle listings including zip code, year, make and model. Similarly, in the example shown, the car extract program 276 accesses vehicle data 294 also within database 106 that provides particular vehicle identifiers, year, make/model and zip code. The make/model lookup table extract program 278 in the preferred exemplary embodiment accesses a make/model lookup table 296 that correlates make and model with valid make/model combinations.

Figure 4B:
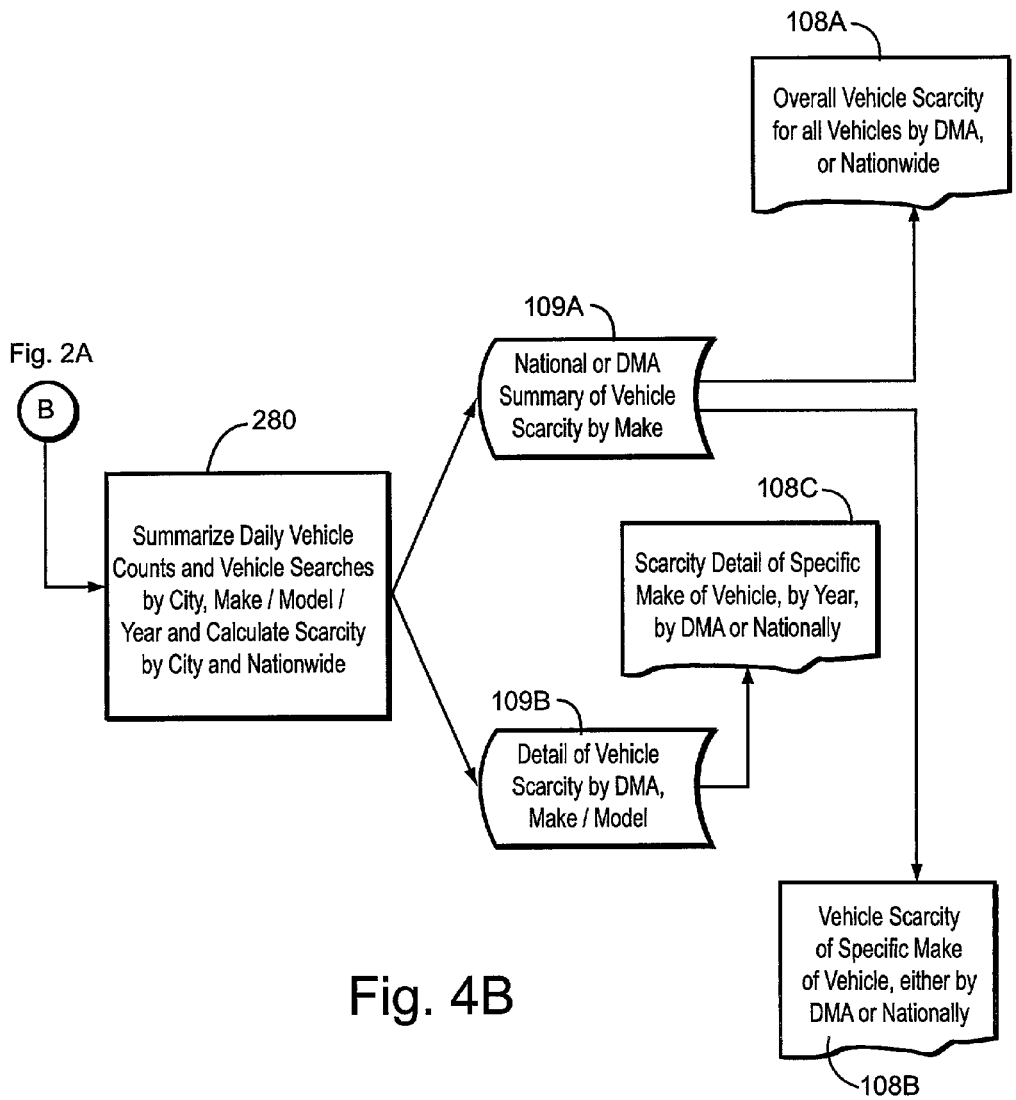

As shown in FIG. 4B, the scarcity index of the preferred embodiment is calculated by block 280. In the exemplary illustrative embodiment, the scarcity index is a calculated variable that in simple terms represents the relationship between vehicles searched and vehicles listed within database 106. The scarcity index report routine 109*a*, 109*b* provide both a summary level (109*a*) and a more detailed level (109*b*). The detailed level 109*b* of the scarcity index report provides the scarcity index by DMA, vehicle make/model, and vehicle year. A summary level 109*a* of the scarcity index report generating routines provides the scarcity index by DMA and vehicle make/model only in the illustrative embodiment.

In the exemplary embodiment, the building blocks of the summary level report generation 109*a* including the following:

monthly searches for each make/model combination by DMA (Searches),
monthly inventory for each make/model combination by DMA (Listings),
the ratio of searches to inventory by DMA (Searches per Listing),
average searches by DMA (Mean Searches),
average inventory by DMA (Mean Listings),
the ratio of average searches to average inventory by DMA (Mean Searches per Mean Listings),
where Scarcity Index=(Searches per Listing/Mean Searches per Listing)*100.

Calculating the Mean Searches per Listing by DMA provides a "normalized" meaning to the scarcity index. This allows the resulting values to have the same meaning for different DMA's and for different products or services (for example, a scarcity index for a product can be compared with the scarcity index for the same or different product within the same or different geographical market in order to assess relative scarcity). Moreover, the scarcity index report generators 109*a*, 109*b* may also calculate a National Scarcity Index. This allows comparison of the vehicle scarcity by DMA relative to the national scarcity of the vehicle. Note that the monthly inventory calculation (above) in the preferred exemplary illustrative embodiment comes from a one-day snapshot of the inventory database 106. This could be a sum or an average, but in the preferred exemplary embodiment it is a more static representation of vehicle inventory.

The building blocks of the detail level report generator 109*b* are the same as for the summary level generation 109*a* and the scarcity index calculation is the same in the preferred exemplary embodiment. The major difference is the way the searches are calculated. Due to the nature of the search procedure shown in FIGS. 3A-3C in the preferred exemplary embodiment, consumers 90 may search for a particular make/model within a range of year values. Therefore, if someone were to search for a 1990-1995 Honda Accord, the preferred embodiment includes one search for a 1990 Honda Accord, one search for a 1991 Honda Accord, etc. The national scarcity index is also calculated for the detailed level of the scarcity index report generation 109*b* and utilizes this "year detail range" search counting method.

In accordance with yet another aspect, the preferred illustrative exemplary embodiment improves accuracy by using empirical analysis to further process (e.g., weight) raw scarcity index values for selected items or categories to take certain human psychology factors into account. For example, many of us will occasionally spend time searching for products and services we do not actually intend to purchase. As one example, people will sometimes search for "high ticket" items (e.g., a 1965 Mustang Convertible automobile, an expensive camera, a private jet, a high-priced designer dress, a beach house in the Bahamas, etc.) simply out of curiosity. If there are a significant number of such searches, raw scarcity indices can become skewed because such searches provide a false indication of consumer demand. The application of an additional, empirical weighting process to adjust the raw scarcity index improves accuracy by taking such psychological factors into account.

FIGS. 5A, 5B and 5C show example scarcity index reports. Referring to the FIG. 5A exemplary report (an overall vehicle scarcity report for all vehicles by DMA or nationwide), the report sets forth one or more selected markets (e.g., Billings Mont.), the make and model of each vehicle type listed within database 106 for that market, the number of searches performed, the number of vehicles available, the ratio of searches per vehicle, the scarcity, the national scarcity for that particular make/model and a delta or difference value. This particular exemplary report shown in FIG. 5A shows that a Jeep Cherokee is highly sought after and is relatively scarce in Billings Mont. but that Jeep Cherokees are not as scarce in Billings as they are nationwide. The report also shows that an Acura model RL is scarce in Billings Mont., and is more scarce in Billings than it is nationwide.

Referring to FIG. 5B, the more detailed vehicle scarcity report 108 shown there sorts vehicle types by make/model for a specific make of vehicle. Referring to the exemplary vehicle scarcity report shown in FIG. 5C, the data here is broken down by specific model year to provide a finer granularity of scarcity reporting. Note that these various reports may also be sorted in order of relative scarcity (i.e., a product with a higher scarcity index is relatively more scarce and may therefore be listed first).

In the preferred exemplary embodiments, system 200 may deliver reports 108*a*, 108*b*, 108*c* on a subscription basis. For example, to maintain the value of this data, subscriptions to the report might be limited to a certain number of dealers in each geographical area (DMA). The subscription could be on a fee basis. Alternatively, such reports could be provided to partners or others as a value-added feature. Depending upon the amount of search traffic that servers 104 receive and the number and scope of the listings provided within database 106, system 200 may be in a unique position to track consumer demand for products listed. In this specific exemplary embodiment, the scarcity index of a vehicle provides an accurate demand measure compared to availability. The reporting provided by reports 108 may be especially useful, for example, to dealers seeking information about consumer demand and market opportunities based on current supply. Retail used vehicle dealers are typically seeking opportunities within their own markets. Online and other auction processes and available sales measures may provide limited information regarding demand. Combined with the interaction with consumers 90 offered by system 200, the scarcity reporting described herein may close the loop between existing measures and consumer preference. By recording all vehicle searches and comparing that information to the available listings on both a national level and within a given market, the resulting information can be used to index vehicle demand. In the illustrative embodiments, the comparison between searches to listing ratio for a given vehicle as compared to the market results in scarcity index. The information may be provided to participating dealers by way of a printed report that could be delivered periodically such as monthly. In the exemplary embodiment, the data utilized in the creation of the scarcity reporting 108 may be collected periodically such as daily.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

What is claimed is:

1. A method of using networked computing devices to automatically, by computer, quantitatively assess and report on scarcity indicating demand versus supply of available items by observing and recording aspects of consumer behavior with respect to an online searchable database listing inventory of items available for selection by said consumers, said method comprising:
   (a) maintaining, on a server connected to a network, a storage of listings of items in inventory and available to consumers in a searchable database;
   (b) enabling online users to search said searchable database of item inventory listings with consumer-operated online appliances connected to said network, including receiving search criteria from user online appliances via the network and applying said received user-search criteria to query said searchable database of item inventory listings stored on the server to provide query results;
   (c) logging, with the server, information based at least in part on said received search criteria and query results, said logged information including at least the quantity of searches for items within said database and the quantity of available items in inventory returned from said database query results; and
   (d) assessing the scarcity of at least one queried item based on the quantity of available said items in inventory returned from said database queries by computing, using at least one processor, a quantitative scarcity index value qualified by a specific geographical area, said determined quantitative scarcity index value representing a relationship between a quantity of items searched and a quantity of items in inventory to thereby quantitatively indicate demand of said items as compared to quantity of said items available in inventory for said specific geographical area; and
   enabling said computed scarcity index to be used to align sales inventory with market supply and demand in said specific geographical area, thereby achieving a change of state of inventory of items available in inventory to consumers in said specific geographical area, thereby automatically measuring relative scarcity to predict item scarcity through use of computers and computer networks.

2. The method of claim 1 wherein said items comprise new and used vehicles.

3. The method of claim 1 wherein said assessing step comprises calculating the scarcity index value by dividing searches per listing by mean searches per listing over a given time period for said specific geographical sub-market area, i.e.:

$$\text{Scarcity index} = (\text{searches per listing})/(\text{mean searches per listing}),$$

where "searches per listing" is the ratio of average searches to average inventory, and "mean searches per listing" is the average number of searches across the database and thus indicates overall consumer interest in relevant listings collectively.

4. The method of claim 1 wherein said assessing comprises calculating a ratio of searches per listing divided by mean searches per listing indicative of the average number of searches across the database.

5. The method of claim 1 further including eliciting geographical location from online users searching said database, and wherein said accessing assesses said quantitative scarcity index value within a specific geographical sub-market area.

6. The method of claim 5 further including reporting on a comparison between scarcity within different geographical sub-market areas.

7. The method of claim 1 wherein said logging logs searches against multiple entries within said database as pertaining to each of said multiple searches.

8. The method of claim 1 wherein said scarcity accessing comprises assessing the scarcity of a category of vehicles.

9. The system of claim 1 wherein said assessing accesses said quantitative scarcity index value based on searches for each item by geographical market; inventory for each item; and ratio of searches to inventory by geographical market.

10. The system of claim 1 wherein said assessing assesses said quantitative scarcity index value based on ratio of searches to inventory.

11. The system of claim 1 wherein said assessing assesses said quantitative scarcity index value based on ratio of average searches to average inventory.

12. The method of claim 1 wherein said assessing includes using empirical analysis to weight quantitative scarcity index values to account for human search psychology factors.

13. The method of claim 1 wherein said computing is performed based on a snapshot from the database providing a static representation of items in inventory.

14. The method of claim 1 wherein said searches are deconstructed to providing year detail range search counting.

15. The method of claim 1 wherein said assessing further includes normalizing the scarcity index to allow the resulting calculated scarcity index to have the same meaning for different markets.

16. The method of claim 1 further including comparing, automatically by computer, scarcity of an item in different geographical or other markets.

17. A system for quantitatively assessing and reporting on a quantitative vehicle scarcity value indicating demand versus supply of new or used vehicles, comprising:

an online vehicle listing service accessible on a server via the Internet by multiple users simultaneously, said online listing service allowing said multiple users to query a database stored on the server of available vehicles by at least vehicle make/model and vehicle year of manufacture, said online vehicle listing service eliciting geographical information from said users;

said server including a query data logger that logs at least some information, including elicited geographical information, regarding said queries of said database of available vehicles by said users;

a processor providing a quantitative scarcity calculator that automatically calculates, based at least in part on said logged information, quantitative vehicle scarcity values qualified by selected geographical areas, said quantitative vehicle scarcity values quantitatively indicating demand of said vehicles as compared to quantity of said vehicles available in inventory for said selected geographical areas; and said processor further providing a scarcity report generator that reports said quantitative vehicle scarcity values representing the relationship between vehicles searched and vehicles listed online and thereby quantitatively indicating demand of vehicles within selected geographical area as compared to supply of said vehicles within said selected geographical area, said calculated quantitative vehicle scarcity value being useful to align sales inventory with market supply and demand in said selected geographical area, thereby automatically measuring relative scarcity to predict item scarcity through use of computers and computer networks.

18. The system of claim 17 wherein said scarcity calculator summarizes daily vehicle counts and vehicle searches by city.

19. The system of claim 17 wherein said scarcity calculator compares selected vehicle scarcity within a particular selected geographical region to vehicle scarcity nationwide.

20. The system of claim 17 wherein said scarcity calculator calculates a quantitative scarcity index value for each of plural vehicle make/model/year combinations.

21. The system of claim 20 wherein said scarcity calculator calculates a ratio, for each make/model/year of searches per listing divided by mean searches per listing, wherein searches per listing is the ratio of searches to inventory and mean searches per listing is the ratio of average searches to average inventory.

22. The system as in claim 17 wherein said vehicles comprise cars and trucks.

23. The system of claim 17 wherein said scarcity calculator calculates said quantitative vehicle scarcity value by vehicle category.

24. The system of claim 17 wherein said assessing accesses said quantitative vehicle scarcity value based on searches for each vehicle make/model by market; inventory for each vehicle make/model; and ratio of searches to inventory by market.

25. The system of claim 17 wherein said assessing assesses said quantitative vehicle scarcity value based on ratio of searches to inventory.

26. The system of claim 17 wherein said assessing assesses index value scarcity value based on ratio of average searches to average inventory.

27. The method of claim 17 wherein said assessing includes using empirical analysis to weight quantitative vehicle scarcity values to account for human search psychology factors.

28. The method of claim 17 wherein said scarcity value comprises a scarcity index=(searches per listing)/(mean searches per listing), where "searches per listing" is the ratio of average searches to average inventory, and "mean searches per listing" indicates overall consumer interest in relevant listings collectively.

* * * * *